Jan. 9, 1940.  H. C. WENDT  2,186,689
VEHICLE BODY STRUCTURE
Filed Oct. 3, 1938  2 Sheets-Sheet 1

HERBERT C. WENDT
INVENTOR.

BY Louis Illmer
ATTORNEY.

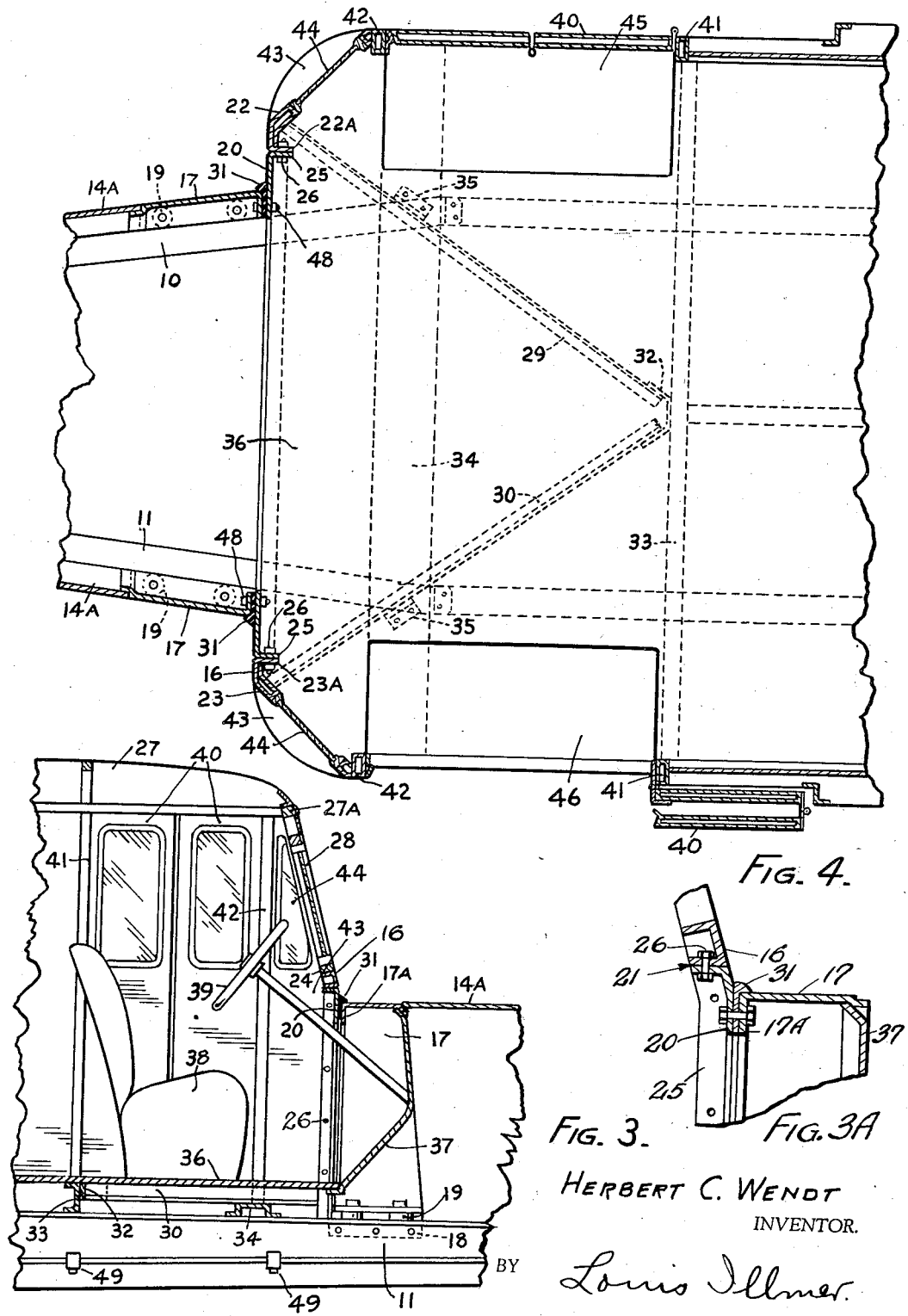

Patented Jan. 9, 1940

2,186,689

UNITED STATES PATENT OFFICE 2,186,689

VEHICLE BODY STRUCTURE

Herbert C. Wendt, Wilson, N. C., assignor to Hackney Brothers Body Company, Wilson, N. C., a corporation of North Carolina Application October 3, 1938, Serial No. 233,002

7 Claims. (Cl. 296—28)

The present invention relates to motorized closed vehicle body structure, and more particularly has to do with an improved cowl mounting equipped with yieldable relief means interposed between the rear cowl end and a relatively rigid frontal wall of a closed vehicle body and which tunnel shaped cowl is demountably upheld across a pair of chassis frame channels independently of said body. The intent of the instant innovation is to provide for a limited frontal wall tilt movement in a direction lengthwise of the vehicle body by the use of a laterally yieldable diaphragm or the like compensating means whereby to deliberately introduce a certain degree of protective give for relieving the frontal wall of localized end thrust by the cowl and to ameliorate body rumble, particularly when its travel upon a rough road bed is likely to set the frame channels into excessive cross vibration because of downward body whip or likewise where a loosened shiftable body tends intermittently to surge back and forth somewhat along such supporting framework. Modern resilient engine mountings of the rubber pad type usually aggravate such deficiencies and my relief means aim to compensate for the cited defect and to reduce the localized stress duty that may otherwise be imposed upon such intermediary cowl member and its associated body parts. A single compensating device is herein made to protect both the cowl and engine hood.

The object of my improvements is to provide for a body assembly of the indicated character capable of being fabricated on a low cost productive basis and which assembly includes a demountable cowl that is installed independently of the body across common frame beams and in which my compensating anti-rumble mounting is made to substantially alleviate the frontal body wall from laterally directed cowl thrust.

Embodied herein are also novel structural reenforcements and other body features that cooperate with my cowl relief means arranged to facilitate the end in view. Reference is had to the accompanying two sheets of drawings that illustrate a preferred exemplification and in which drawings:

Fig. 2 is a transverse sectional view thereof taken along 2—2 of Fig. 1, while Fig. 3 is a longitudinal sectional view taken along 3—3 of Fig. 2.

Fig. 3A presents a fragmental view corresponding to Fig. 3 in which certain details have been enlarged.

Figure 1:
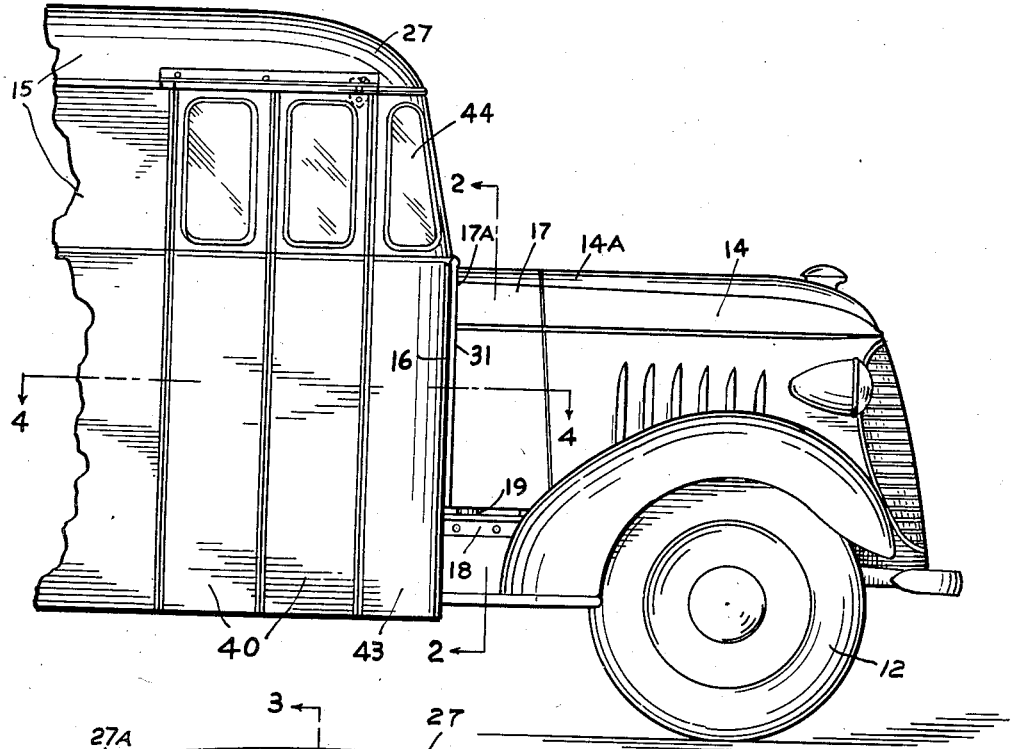
Fig. 1 represents a fragmental side elevational view of a truck body assembly equipped with my improved cowl devices.

Fig. 4 shows a view taken along 4—4 of Fig. 1 and details a forward floor portion of my body understructure including the use of brace struts depicted in dotted outline.

Referring more specifically to these disclosures, my conventional chassis comprises a pair of longitudinal channels or frame beams 10 and 11, which are superimposed upon the usual axles (not shown) that respectively mount a pair of front wheels 12 and rear wheels 13.

The forward portions of the respective chassis channels are herein bridged by an engine or the like motive unit together with its housed transmission gear in a conventional manner (not shown) as will be understood. The motor foot lugs are preferably installed resiliently upon rubber cushioned bracket pads. A louvered engine hood 14 of any suitable design, encases the motor therebeneath and is intended to straddle the chassis frame channels and to be fastened in place in the usual manner.

Figure 2:
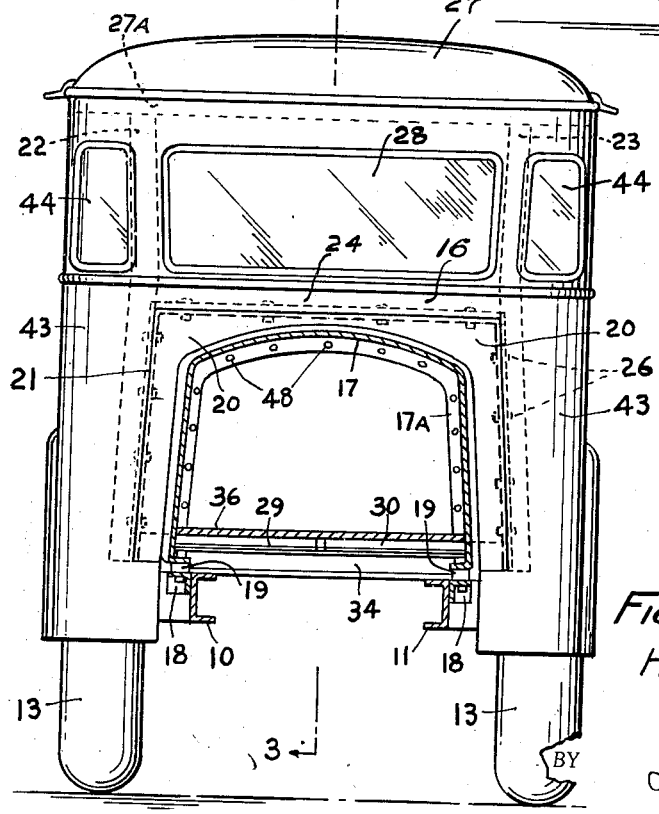

A truck or other automotive body 15 is demountably carried upon the frame beams rearward of the engine hood, as shown in Fig. 1. Said body is preferably shaped to provide for a faced transverse frontal wall portion 16 that is kept spacedly mounted with respect to the tail end 14A of the engine hood. Interposed therebetween is a demountable tunnel-like cowl 17 of sheet metal or other material that may be cross-sectionally U-shaped as detailed in Fig. 2. The forward cowl end may be lipped to overlappingly receive said tail end 14A and the crowned rear cowl end 17A is located adjacent to the frontal body wall or face 16.

The feet of said cowl may rest upon the respective frame channels and be upheld by outwardly overhanging angle irons such as 18. If desired, rubber buffer pads such as 19 may be inserted to vertically cushion the bolted cowl mounting, although such expedient is non-essential.

Referring in further detail to my frontal body face, this may be provided with a protective compensating diaphragm 20 whose perimeter may be given a rectangular or other suitable shape, said diaphragm being preferably kept relatively thinner than conventional body sheathing and adapted to yield readily in the manner of a breather plate when subject to a varying lateral thrust.

Said diaphragm may be rigidly or slip inset into a rectangular opening 21 formed in the lower medial region of said frontal body face or wall portion 16. It is preferred to incorporate a pair of relatively rigid windshield posts 22 and 23 that respectively define a vertical edge of such frontal opening and serve to adequately stiffen the frontal body wall and its associated windshield mounting. As shown in Fig. 4, a portion of each such post may be cross-sectionally shaped from sheet metal to terminate in an internal flange such as 22A or 23A that are respectively directed rearwardly.

The medial region of said posts may be bridged by a similar relatively rigid windshield sill beam 24 in the Fig. 3A manner, said beam being also equipped with an arcuate inturned flange connecting the top portions of the integral post flanges 22A and 23A. The marginal regions of the diaphragm 20 may be correspondingly inturned to provide for a continuous brim flange 25 shaped to telescopically nest within and snugly close the opening 21. If desired, a strip gasket may be utilized to seal such telescopic joint against inclement weather. A series of bolts or other like fastening means 26 may also be entered through mated telescoped flanges to secure the brim flange in place. My breather plate 20 may be given a U-shaped contour of which the inner perimetric edge is shown as being disposed in substantial registry with the corresponding inturned marginal shape of the crowned rear cowl end 17A. A waterproof joint may be had therebetween by the insertion of a rubber moulding of the lipped seal type such as 31, this being retained in place by plural clamping bolts such as 48 (see Fig. 4).

The upper ends of the rigid posts 22 and 23 may be carried to the transverse body deck beam 27A and a sashed windshield 28 is suspended thereacross. It will be observed that the plane of my diaphragm 20 is made to fall into substantial alignment with the windshield sill and that the cowl feet are secured to the respective frame beams independently of the body 15 by the bolted buffers 19. The mounting of the respective windshield posts may be reenforced by a pair of brace struts such as the angle irons 29 and 30 disposed obliquely in aligned V-shaped or wishbone fashion. The diverging overhanging ends of said struts may be attached to the lower end region of the respective windshield posts by welding or the like securement. The converging strut ends may be directly welded or otherwise fixedly tied by an angular clip 32 to a cross beam 33 that is transversely mounted upon the frame channels 10 and 11. A relatively flat tie beam 34 is likewise arranged and may have the struts overhangingly superimposed thereon, as shown. A bracket such as 35 may secure each strut to its tie beam and thus provide for a rigid understructure for the forward body portion.

Demountable J-bolts such as 49 preferably serve to clamp the body superstructure to the frame beams. As indicated in Fig. 3, the body floor board 36 may conceal such understructure therebeneath and the forward board edge may cooperate with a foot board 37 that extends into the cowl. It will be obvious that if desired, said frontal face opening may also be kept closed without providing for any additional foot room in the cowl interior. A driver's seat 38 and a steering wheel 39 may also constitute standard equipment.

Any suitable sliding or folding side door may be resorted to. As shown, a collapsible sectionalized door such as 40 may be top guided to open outwardly from each body side, the hinged jambs 41 thereof being integrally welded to the respective ends of the cross beam 33 that extends laterally beyond the frame channel confines. A mated sheet metal jamb post such as 42 may be fixedly erected upon each offset end of the tie beam 34 and a rigidly mounted body corner sheath portion 43 may overlappingly extend between each last named jamb post and its adjacent windshield post, as shown. Each such door jamb may be carried downwardly below the floor level and behind a side wall sheath in the skirted Fig. 1 fashion. If desired, a flat or dished window panel 44 may be inserted above each corner sheath 43.

It is preferred to provide my relatively wide body with reversely disposed step wells or depressed platforms such as 45 and 46 which lie one step beneath the floor level to extend inwardly of the respective side door sills toward a contiguous upright web face of a frame channel 10 or 11 as in Fig. 4. The floor board 36 may rest upon the respective brace struts 29 and 30 and serve to uphold the depending side walls of said step well, said understructure being purposely arranged to facilitate the installation of such wells. The remainder of my body may be built up in a conventional manner, with or without step wells.

The intended mode of operation of my cowl relief devices may be traced as follows: Assuming the vehicle wheels to be traveling at a relatively fast rate over a bumpy roadway, reaction on part of the vertically accelerated body weight tends to intermittently flex the frame channels downwardly with respect to its initial or normal sag, which in turn causes the frontal wall face 16 to tilt somewhat toward the upper edge portion of the hood tail end 14A and thereby cramp the top or crown portion of the separable cowl 17 whose respective feet may be demountably carried by the frame channels 10 and 11 independently of the attached body 15. My compensating diaphragm 20 when tightly secured in place by the bolts 26, will then undergo a corresponding breathing action which substantially relieves said frontal face from drum effects and serves to reduce localized stresses that may otherwise be imposed upon the several body members, including its inbuilt cowl. Should the perimetric dimension of the engine hood closely conform in size with the telescopic brim flange opening afforded by my diaphragm, the bolt receiving holes thereof may be elongated longitudinally to provide for the use of somewhat looser bolts that permit of a limited slip joint accommodation without reliance upon diaphragm action. In practice, either such relief alternatives are likely to reveal a considerable relative movement between the body and its adjacent cowl, such weaving effect being more pronounced at the crown portion of the rear cowl end 17A.

It is preferred to rigidly mount the windshield posts 22 and 23 also their bridging sill beam 24, and to this and other ends, the bottom region of each such post may be cooperatively fortified by the brace struts 29 and 30. By the use of the described compensated relief means, a vehicle body assembly is better enabled to absorb extreme frame channel whip, without subjecting contiguous body sheaths or component posts to high localized stress likely to lead to ultimate rupture or tear by fatigue after long repeated stress loadings. The same result may be had by centering my compensating means in the vicinity of the crown end portion of the cowl without necessarily carrying the frontal opening 21 down to the level of the chassis beams. Furthermore, in lieu of the frontal opening 21, an imperforate flat sheath may as an equivalent, be correspondingly recessed or inset flatwise and have a diaphragm 20 suspended thereover. Such alternative is intended to be embodied in the words "opening" or "recess" as used in the claim terminology.

The foregoing explicit disclosures should make apparent to those skilled in this art, the inherent advantages afforded by my improved body and cowl assembly, it being understood that various equivalent changes in the illustrative embodiment thereof may be resorted to, all without departing from the spirit and scope of my invention heretofore described and more specifically defined in the appended claims.

I claim:

1. A motorized vehicle body comprising a substantially flat faced frontal wall erected crosswise upon a pair of longitudinal chassis beams and which wall has an opening in the lower medial region thereof, a perimetric portion of said opening being provided with a flange extending lengthwise of the body and the upper wall region being equipped with a rectangular windshield having a transverse sill edge, compensating diaphragm means including a brim flange portion inset into and arranged to telescopically nest within the first named flange and which nested flanges are slip jointed, said diaphragm means being disposed in substantial planiform alignment with the aforesaid sill edge, and a tunnel shaped cowl disposed to bridge said beams and located forwardly adjacent to such slip jointed diaphragm in cooperative relationship therewith.

2. A motorized vehicle body comprising a substantially flat faced frontal wall erected crosswise upon a pair of longitudinal chassis beams and which wall face has a substantially rectangular depression in the lower medial region thereof, a relatively rigid windshield carrying post disposed contiguous to each vertical edge region of such face depression, a windshield sill beam suspended between said posts and defining the upper edge region of said depression, said posts and the sill beams respectively being equipped with an inturned flange disposed lengthwise of the body, a compensating diaphragm including a brim flange portion arranged to telescopically nest within the respective inturned flanges, fastening means securing the respective nested flanges, and a tunnel shaped cowl arranged to bridge said beams and located forwardly adjacent to said diaphragm in cooperative relation therewith.

3. A motorized vehicle body comprising a substantially flat faced frontal wall erected crosswise upon a pair of longitudinal chassis beams, complementary spaced windshield carrying posts incorporated in said wall and serving to impart lateral rigidity thereto, protective compensating means installed between the lower end regions of the respective posts, a tie beam and a rearwardly located cross beam respectively spanning the chassis beams, a pair of brace struts extending divergently forward from the cross beam and obliquely across the tie beam to respectively terminate at the foot region of a different post, and a tunnel shaped cowl disposed to bridge said chassis beams in a cooperative forwardly adjacent relation to said compensating means.

4. A vehicle body comprising a floor board and a relatively rigid frontal wall erected crosswise over a pair of longitudinal chassis beams, a transverse deck beam component for said wall, complementary windshield posts extending downwardly from the deck beam beneath the floor level, a cross beam adjoinedly spanning the chassis beams, and nested oblique brace struts extending beneath the floor board in divergent forward directions from said cross beam and which braces are respectively secured to the foot region of a different post.

5. A vehicle body comprising a floor board, complementary side walls and a frontal wall erected crosswise over a pair of longitudinal chassis beams, a transverse deck beam component for said frontal wall, complementary windshield posts extending downwardly from the deck beam beneath the floor level as components of the frontal wall, a cross beam bridging said chassis beams and having a cross beam end extended to laterally overhang one of the chassis beams, mated oblique brace struts extending beneath the floor board in divergent forward directions from said cross beam and which braces are respectively secured to the foot region of a different post, a side door jamb extending beneath the floor board level and secured to the overhanging end region of said cross beam, and a step well platform interposed between said overhanging cross beam end region and the brace strut next contiguous thereto.

6. A vehicle body comprising a frontal wall erected crosswise upon a pair of chassis frame beams having an engine mounted across said beams in a forwardly spaced relation to said wall, a protective hood bridging said beams and serving to house the top of said engine, a tunnel shaped cowl including a crown portion interposed between the tail end of said hood and the frontal wall, and protective diaphragm means arranged to compensate for body whip and thereby relieve the cowl of longitudinal thrust when the frontal wall becomes tilted toward said tail end of the hood crown.

7. A vehicle body comprising complementary side walls and an interconnecting frontal wall which is recessed in the lower medial region thereof, a pair of spaced windshield posts incorporated exteriorly of the recess perimeter as frontal wall components, a protective compensating diaphragm spanning said recess, a pair of door jambs incorporated into one of the side walls, a corner sheath extending between one such post and the door jamb next adjacent thereto, and a cowl cooperatively disposed ahead of said diaphragm and which cowl is thereby protected against thrust on part of the frontal wall.

HERBERT C. WENDT.